United States Patent [19]

Holm

[11] Patent Number: 5,193,636

[45] Date of Patent: Mar. 16, 1993

[54] HOOD

[75] Inventor: David R. Holm, Oconomowoc, Wis.

[73] Assignee: Deere & Company, Moline, Ill.

[21] Appl. No.: 557,297

[22] Filed: Jul. 23, 1990

[51] Int. Cl.⁵ .............................................. B62D 25/10
[52] U.S. Cl. .................................. 180/68.1; 180/69.21
[58] Field of Search ................. 180/69.2, 69.21, 69.22, 180/69.23, 68.1, 68.2, 64.3, 69.24

[56] References Cited

U.S. PATENT DOCUMENTS

| | | | |
|---|---|---|---|
| 2,175,528 | 10/1939 | Klavik | 180/68.1 |
| 3,168,344 | 2/1965 | Barenyl | 180/69.2 |
| 3,796,277 | 3/1974 | Gordon | 180/69.22 |
| 3,925,526 | 12/1975 | Haas | 180/69.2 |
| 3,987,776 | 10/1976 | Welck | 123/41.66 |
| 4,535,862 | 8/1985 | LeBlanc | 180/68.1 |
| 4,886,135 | 12/1989 | Nakamura et al. | 180/68.1 |
| 4,889,203 | 12/1989 | Hagarty | 180/69.24 |
| 4,969,533 | 11/1990 | Holm et al. | 180/69.2 |

OTHER PUBLICATIONS

Deere & Company; entitled "John Deere Lawn & Garden Tractors 200 Series"; published in the United States in 1989; cover and pp. 2 and 3.
Deere & Co.; entitled "John Deere Suburban Tractors"; published in the United States in 1988; cover and p. 2.
Deere & Company; entitled "John Deere Lawn and Garden Tractors 300/400 Series"; published in the United States in 1989; cover and p. 8.
White Outdoor Power Products; entitled "Lawn Tractors and Riding Mowers"; published in the United States in 1988, cover and p. 1.
Murray Ohio Manufacturing Company; entitled "Murray Mowers 1984"; published in the United States in 1983; cover and pp. 6 and 7.
Deutz Allis Corporation; entitled "Lawn and Garden Riding Equipment"; published in the United States in 1987; coer and pp. 4 and 5.
Roper Outdoor Power Equipment, entitled "Roper"; published in the United States in 1987, front cover.
Snapper Power Equipment; entitled "Snapper Lawn Tractors"; published in the United States in 1986; front cover.
Ingersoll Equipment Company; entitled "Ingersoll Yard & Garden Tractors Planning Guide"; published in the United States in 1986; front cover.
Yamaha Outdoor Power Equipment Division; entitled "Yamaha YT3600"; published in the United States in 1987; cover and p. 1.
Power King Company; entitled "Economy Through the Ye ars"; printed in 1987 and published in the U. S. by 1988; cover and p. 2.
Wheel Horse Products, Inc.; entitled "Wheel Horse Lawn and Garden Tractors"; published in the U.S. by 1988; cover and p. 3.
American Honda Motor Co.; entitled "Honda Lawn Tractors"; published in the U. S. in 1986, cover and p. 3.
Cub Cadet Power Equipment; entitled "Cub Cadet Product Line 1988"; published in the United States in 1988; cover and p. 1.
The Yard Man Company; entitled "Yard-Man Lawn Tractors"; published in the United States in 1986; cover and p. 1.
Yanmar Tractor, Inc.; entitled "Yanmar GT14"; published in the United States in 1987; cover and p. 1.
Kubota Tractor Corporation; entitled "Kubota Diesel & Gasoline Garden Tractor"; published in the United States in 1989; cover and pp. 10 and 11.
Ariens Company; entitled "Ariens Tractor", printed in 1987 and published in the U. S. by 1987; cover and pp. 2 and 3.
Ford New Holland, Inc.; entitled "Ford 8- to 18- hp Lawn, Yard and Garden Tractors, Riding Mowers"; published in the U. S. in 1989; cover and pp. 2 and 8.

Primary Examiner—David M. Mitchell

[57] ABSTRACT

A hood for a powered vehicle having a top piece and a bottom piece coupled to form a chamber through which air passes to the power source's cooling system. The hood is made by the injecting colored plastic into a mold. An opening is formed between the top piece and the side portions of the bottom piece through which air passes to enter into the chamber. Louvers are also formed in the top piece through which air passes to enter the chamber.

2 Claims, 2 Drawing Sheets

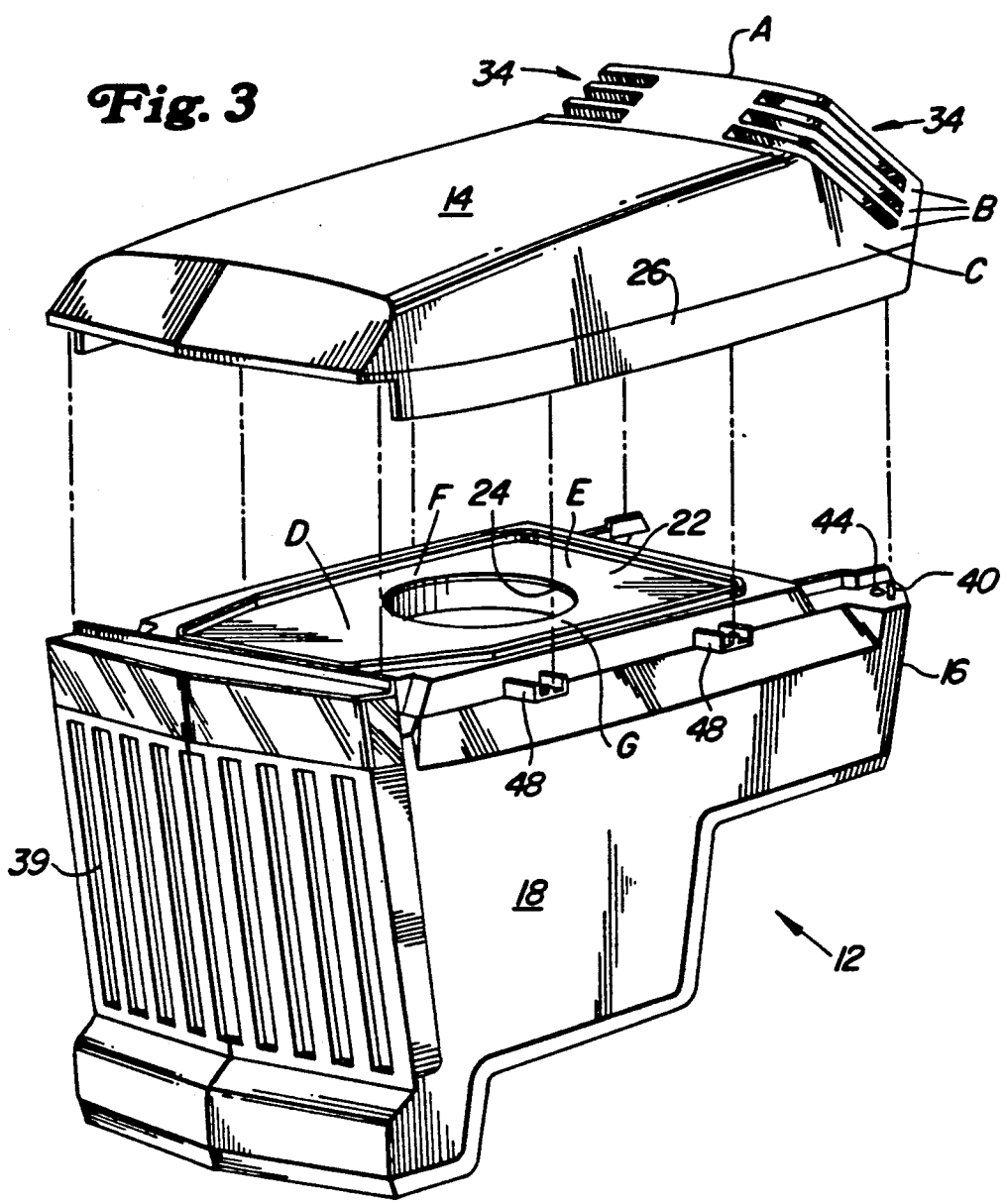
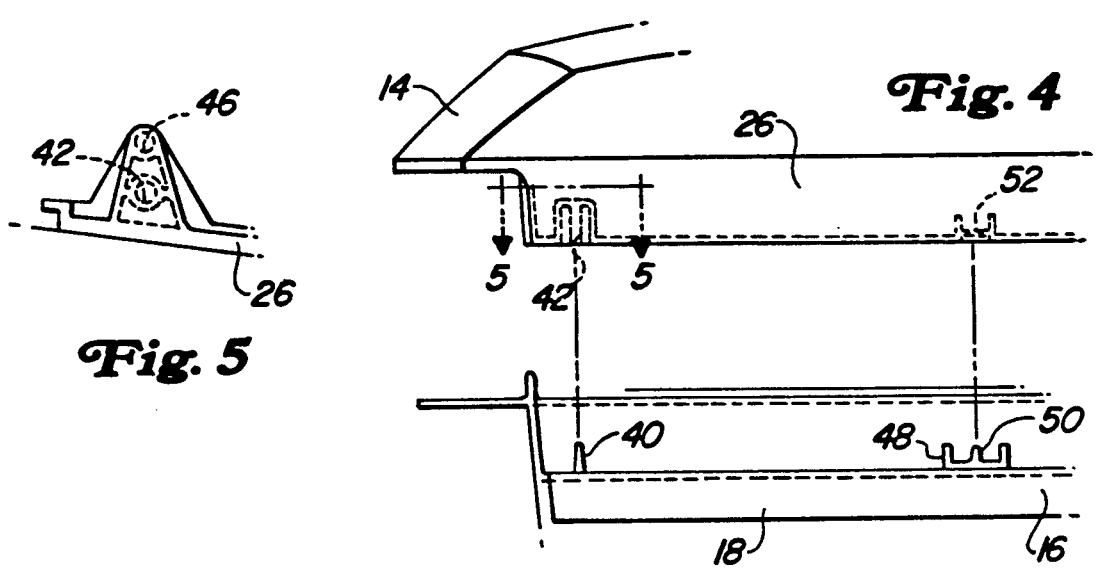

HOOD

BACKGROUND OF THE INVENTION

1. Field of the Invention

The invention relates to hoods as used on powered vehicles such as lawn tractors.

2. Description of the Related Art

Many conventional lawn vehicles provide painted metal hoods. The powder painting method is an economical way to paint these metal hoods. This method involves electrically charging the hood while charging paint powder with an opposite electrical charge. The opposite electrical charge holds the powder against the hood, and the hood and powder are heated to melt the powder and provide a smooth finished surface. However, irregular shaped surfaces such as slotted openings or louvers formed in the hood for drawing in air to the engine's cooling system during operation can not generally be painted well using the powder paint method. It is known to produce these louver pieces separately for later attachment to an otherwise powder painted hood. These louvers have been seperately manufactured by injecting colored plastic into a mold to form the louvers and require attachment to the hood by means such as bolts and attachment bosses which raise the cost of manufacture.

Hoods have been manufactured using the injection molding process in an effort to reduce costs. These hoods are molded in color to eliminate the separate painting step. However, several factors inherent in the injection molding process tend to detract from the appearance of conventional plastic hoods. The plastic injected within a die can only be forced a certain distance within the die. The length that the plastic can be forced within the die is dependent on several factors, including the cross sectional area of the piece to be formed, the pressure at which the plastic is injected into the mold, and the material characteristics of the plastic. If the size of the hood is larger than the distance that the plastic can be forced within the die, then the plastic must be introduced into the die at several locations called gates. Therefore, many conventional hoods are gated at a plurality of locations so that the distance the plastic must flow does not exceed the material's flow limit. As the plastic is forced outwardly from the gates the flowing plastic, or flow fronts, emanating from the various gates will meet. A knit line or blemish can occur where these flow fronts meet, causing an undesirable defect in the surface appearance.

In an effort to reduce costs and eliminate the defects in the appearance of plastic hoods molded in color, conventional hoods have been manufactured by the injection molding process and then painted in a subsequent step. The paint is sprayed in a conventional manner since the plastic hood can not withstand the heat involved in the powder painting method. Wet painting a plastic hood therefore requires a painting step that is not involved in injection molding plastic in color. Also, wet painting can leave an"orange peel" surface shine that is not perfectly reflective or shiny, whereas a plastic hood molded in color reflects light more accurately and sharply. Therefore, the wet painting process does not produce a finished surface as aesthetically pleasing as the plastic hood molded in color.

Conventional injection molded hoods are generally less rigid than metal hoods. The flimsiness associated with plastic hoods can be perceived by the operator as undesirable or an indication of low quality.

It is known to provide openings or air ducts in the hoods for allowing air to pass through the hood to the cooling system. Many of these hoods provide conduits for channeling this air to the cooling system. Such conduits generally require attachment within the hood, which adds cost to the manufacture of the hood. Also, these conduits can channel air past or near portions of the engine that are hot. The air in the conduit heats up as it passes these hot areas, which results in the air being heated after entering the hood and before reaching the cooling system, thereby reducing the effectiveness of the cooling system.

It is known to provide hoods with air ducts located at or near the top of the hood. Air at or near the top of the hood during operation is cleaner than air located near the bottom of the hood, since the vehicle wheels and the mower blade each propel dirt and dust into the atmosphere near the bottom of the hood. Therefore, placing the air inlets as remotely as possible from the lower portion of the vehicle is desirable. Further, the larger the opening of the air inlet the slower the velocity of the air passing therethrough. A slower air velocity facilitates drawing in clean air, since only the smallest, lightest particles of debris are drawn in when the suction force is low. The air utilized by the cooling system is thereby cleaner.

Therefore, it would be desirable to provide a more rigid plastic hood made by injection molding plastic in color, and that eliminates or reduces the visual effect of knit lines associated with multi-gating injection. It would be desirable to provide such a mower with large inlets through which air for the cooling system may pass, said openings being located near the top of the hood and away from the ground. It would be desirable for such a hood to eliminate the need for separately attaching a conduit extending between the opening and the cooling system, and to provide for a low velocity of air so that large particles are not drawn in to the cooling system.

SUMMARY OF THE INVENTION

The present invention provides a plastic hood manufactured in color by the injection molding process for use with vehicles such as lawn tractors. The hood is comprised of a top and bottom piece coupled together. The knit lines normally associated with injection molding in color are eliminated or minimized by using a single gate for the top piece and a pair of gates for the bottom piece. The hood therefore does not require a separate painting step during manufacture. Openings are defined where the two pieces meet in order to allow air for the engine's cooling system to travel into the hood. The openings and a set of louvers are positioned high on the hood to draw in clean air. The two pieces form a chamber for directing the air from the openings and louvers to the cooling system air inlet. The chamber keeps the cooling air away from portions of the engine that are hot in order to keep the air cool. The chamber also acts to rigidify the hood.

Therefore, the present invention provides a rigid plastic hood made by injection molding plastic in color, and having little or no visual effects of knit lines associated with multi-gating injection. The hood according to the present invention provides large inlets through which air for the cooling system may pass, said openings being located near the top of the hood and away from the ground for drawing in clean air. The hood eliminates the need for separately attaching a conduit extending between the opening and the cooling system. The present invention provides for low cooling air velocity so that large particles are not drawn into the hood.

BRIEF DESCRIPTION OF THE DRAWINGS

FIG. 3 is an exploded view of the hood showing the top piece removed from the bottom piece.

FIG. 4 is a partial view of the front right corner of the hood with the top and bottom pieces unattached.

FIG. 5 is a sectional view taken along Section 5 of FIG. 4, and shows the front right corner of the top piece.

DESCRIPTION OF THE PREFERRED EMBODIMENT

Figure 1:
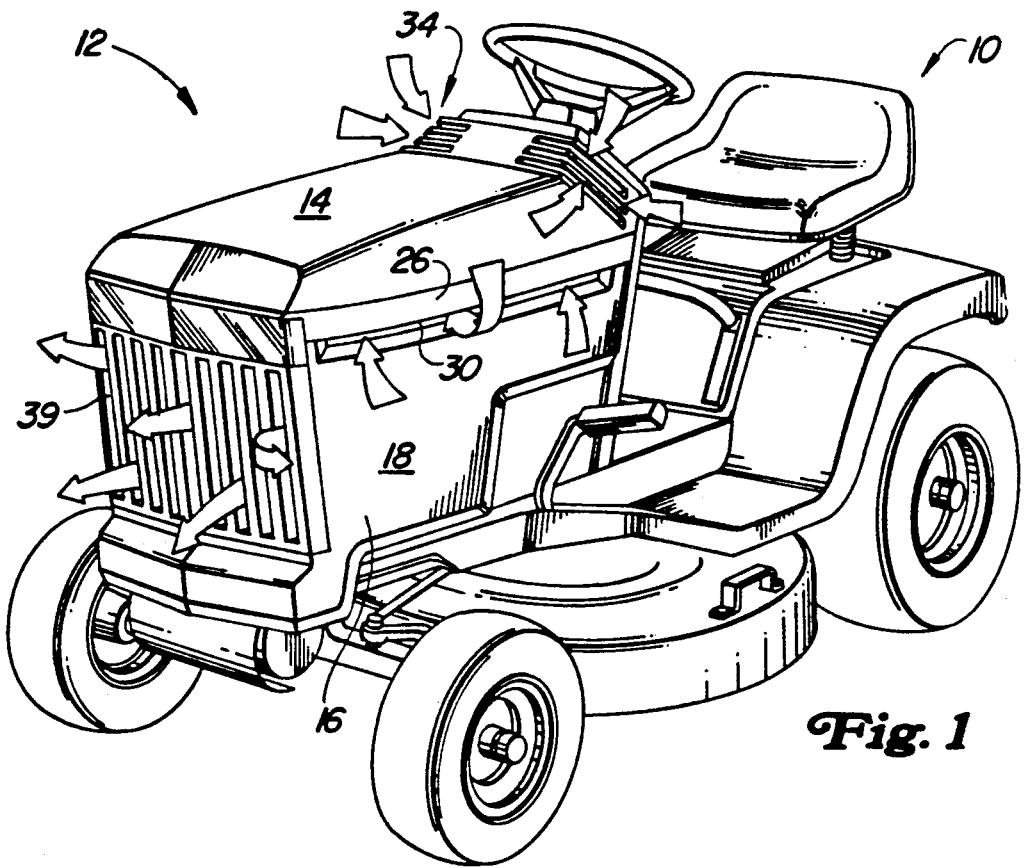
FIG. 1 is a perspective view of a garden tractor having the hood according to the present invention.
Figure 2:
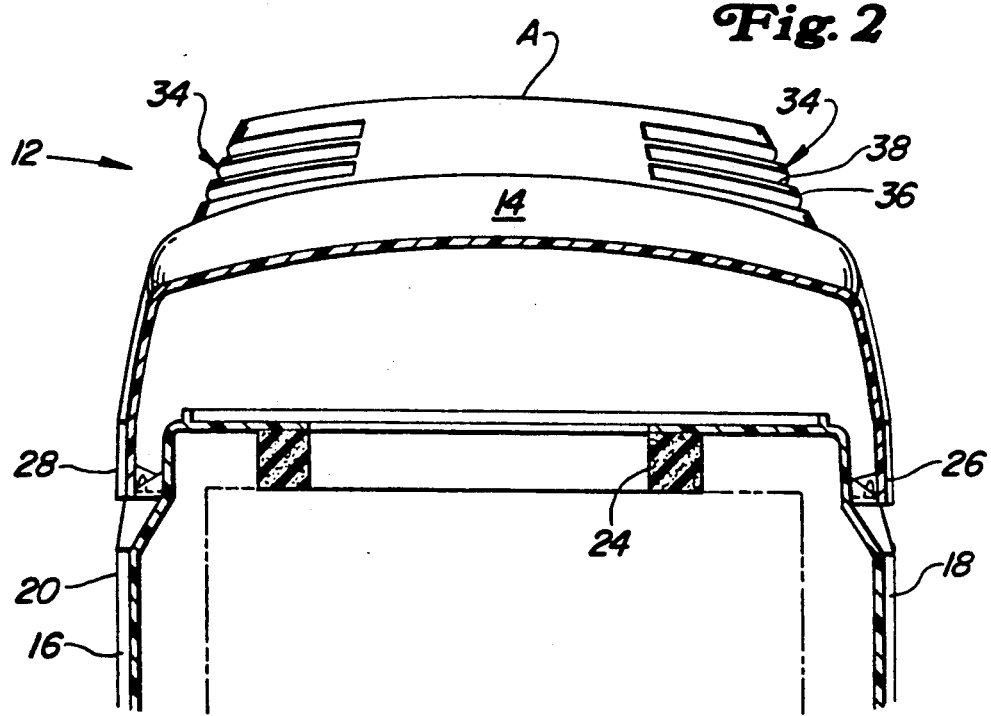
FIG. 2 is a sectional view of the mid portion of the hood.

Referring now to FIG. 1, there is shown the preferred embodiment of the present invention as used on a vehicle 10 such as a lawn and garden tractor. The hood 12 has a top piece 14 and a bottom piece 16. The bottom piece 16 has side portions 18, 20 and a middle portion 22 therebetween that defines an opening 24. The opening 24 is situated to fit around an internal combustion engine's cooling system air inlet (not shown). The top piece 14 is curved to open downwardly and is coupled to the bottom piece 16 along lower side portions 26, 28.

Means is provided for conducting air from outside of the hood 12 to the cooling system inlet. The lower side portions 26, 28 of the top piece 14 are reclined on or coupled to the bottom piece 16 such that a space or side inlet 30 is defined between the top 14 and bottom 16 pieces through which air may pass. When coupled together the top piece 14 and the middle portion 22 of the bottom piece 16 form a conduit or chamber 32. Air passes through the side inlets 30 and into the chamber 32, where it then passes through the middle portion's opening 24 and into the cooling system inlet. Louvers 34 having slats 36 and defining openings or louver inlets 38 also provide a means of allowing air to pass into the chamber 32 for introduction into the cooling system inlet. Once the air has passed through the cooling system, it is discharged forwardly from the hood 12 through a grille 39 conventionally attached to the front of the bottom piece 16.

The top 14 and bottom 16 pieces are fastened together at each corner of the hood 12 according to the preferred embodiment. Referring now to FIGS. 4 and 5, there is shown the connection between the top 14 and bottom 16 pieces that is typical of the connection provided at each corner of the hood 12. Corner structures or corner pegs 40 are provided near each of the four corners of the middle portion 22 of the bottom piece 16. The corner pegs 40 are received within mating corner openings 42 formed in the top piece 14. Bottom screw holes 44 formed in the bottom piece 16 are provided adjacent to the corner pegs 40. Top screw holes 46 are formed in the top piece 14 and are aligned with the bottom screw hole 44 for receiving conventional screws that secure the pieces 14, 16 together.

As seen in FIGS. 3 and 4, protruding members 48 are formed on the side portions 18, 20 of the bottom piece 16 and define upwardly extending side structures or side pegs 50. Side openings 52 are defined in the top piece 14 adjacent the lower side portions 26, 28 for receiving the side pegs 50. The protruding members 48 and side pegs 50 act to keep the side inlets open by maintaining the spacing between the lower side portions 26, 28 of the top piece 14 and the side portions 18, 20 of the bottom piece 16. Therefore, as forces are applied inwardly to the lower side edges 26, 28 of the top piece 14 during the operational life of the hood 12, the protruding members 48 will restrict lateral motion of the lower side edges 26, 28 relative to the bottom piece 16 and help to prevent deflection or deformation of the lower side edges 26, 28. The side inlets 30 will therefore remain open for air to pass therethrough.

The bottom piece 16 is conventionally rotatably carried by a rod means (not shown) at the lower front portion of the vehicle 10. When the hood 12 shifts to an open position, the bottom piece 16 rotates upwardly about the rod means and carries with it the top piece 14. When closed, the rear portion of the top piece 14 is positioned adjacent the vehicle steering column.

Next, the manufacture of the hood 12 according to the present invention will be discussed. The preferred embodiment of the hood 12 is made by injection molding plastic in color. A set of die define the mold for the hood 12, and plastic is forced into the die at particular locations called gates. Plastic is injected through the gates and between the set of die to form the finished hood 12. However, the plastic can only be forced a certain distance within the die. Conventional hoods are molded by gating the die at several locations in order to decrease the distance the plastic must flow such that the plastic's flow limit is not exceeded. Knit lines are then created in conventional hoods where the flowing plastic from the different gates meet within the die. The present invention, however, provides a hood 12 comprised of two pieces, the bottom 16 and top 14 pieces. Since the size of the top piece 14 is considerably smaller than conventional hoods, it can be injection molded by using only one gate. Therefore, no knit lines caused by the convergence of flow fronts emanating from different gates will be formed in the top piece 14, since there will be only one gate.

The top piece 14 can be gated between the rear louvers 34 at point A. The plastic will flow into the die during manufacture at point A and flow forwardly toward the front of the top piece 14, and also downwardly and rearwardly to form the louvers 34. The plastic will flow within the portions of the die that will form the slats 36 of the louvers 34, and will therefore split up into separate flow fronts in each slat 36. At the bottom rear portions of the louvers 34 the flows from each slat 36 will converge again near point B to define the rear bottom portion of the louver inlets 38. Knit lines will be formed in the hood 12 near point B as the flow lines converge at the bottom rear of the louver inlets 38. These knit lines will not be in a prominent position on the hood 12. Knit lines may also form near point C in the rear portion of the top piece when the flow that formed the louvers travels forwardly along the lower side edges 26, 28 and meets the flow that traveled straight forwardly along the center of the top piece 14 from the point of injection A. The length of these knit lines is small though, since the size of the top piece 14 between the louvers 34 and the lower side edges 26, 28 is small. Therefore, lengthy knit lines are largely eliminated from the top piece 14 and the visual effect of any knit lines formed near the louver inlets 38 is minimized due to their non-prominent location and short length.

The bottom piece 16 is also injection molded in color and is gated near points D and E on the middle portion 22. Knit lines will be formed at points F and G where the flow fronts emanating from the two gates meet. However, the middle portion 22 will not be visible when the hood 12 has been assembled, so these knit lines will not detract from the appearance of the hood 12. The knit lines in the bottom piece 16 will extend outwardly toward the side portions 18, 20, but will terminate before reaching a portion of the bottom piece 16 that is visible when assembled. The flow fronts from the two gates that meet at points E and F will become uniform before extending into portions of the bottom piece 16 visible after assembly, and therefore these knit lines will not extend into visible portions of the bottom piece 16.

The top 14 and bottom 16 piece will be molded using plastic having the desired color of the finished hood 12. Therefore, when the hood 12 has been molded it is already the proper color, and no extra painting process is required. Once formed, the top 14 and bottom 16 pieces must then be coupled together. The corner openings 42 formed in the top piece 14 are aligned with the corner pegs 40 on the bottom piece 16. The corner pegs 40 are longer than the side pegs 50 and become received by the corner openings 42 before the side pegs 50 are received by the side openings 52. Once positioned within respective corner openings 42, the corner pegs 40 act to guide the top piece 14 into the proper alignment with the bottom piece 16. The side pegs 50 are received within respective side openings 52 as the top 14 and bottom 16 pieces shift toward each other. The top 14 and bottom 16 pieces can then be secured together by tightening screws through the bottom and top screw holes 44, 46 that are aligned with each other.

Next, the operation of the present invention will be discussed. During operation, air for the cooling system will be drawn through the louvers 34 and side inlets 30 and into the chamber 32. Once in the chamber 32, the air is then drawn into the opening 24 in the middle portion 22 of the bottom piece 16 and into the cooling system inlet. The air will exit the cooling system through a grill 39 attached to the front of the hood 12.

The side inlets 30 and louvers 34 are situated high on the hood 12 and away from the ground so that the air drawn in will be clean. The side inlets 30 and louvers 34 are relatively large so that the velocity of the ingoing air is low. The resulting suction force is correspondingly low, such that heavier, larger particles of dirt and debris are not drawn into the hood 12 The air drawn in will therefore be cleaner.

The top piece 14 and the bottom piece 16 are coupled together to form the chamber 32 that acts as a conduit through which air will pass from the louvers 34 and side inlets 30 to the cooling system inlet. The chamber 32 is entirely above the engine, and therefore does not allow the flowing air within the chamber 32 to pass by any part of the engine that is hot. The air that is fed to the cooling system from the chamber 32 therefore remains cool, which enhances the performance of the cooling system. Additionally, the chamber 32 eliminates the need for a separate conduit structure for channeling the air to the cooling system inlet. Therefore, the additional expense of attaching a separate conduit during assembly of the hood 12 is eliminated. The presence of this chamber 32 also acts to rigidify the hood 12 structure. The middle portion 22 of the bottom piece 16 supports the sides of the hood 12 and greatly reduces the flexibility of the top piece 14. The operator observes this rigidity when opening and closing the hood 12, or when removing and replacing the hood 12, and might consider the hood 12 to be more desirable than nonrigid conventional hoods.

I claim:

1. A power source enclosure, as used on a vehicle having a power source cooling system, said enclosure comprising:

a bottom piece having side portions laterally spaced from the power source and extending generally vertically, and having a middle portion positioned above the power source, said middle and side portions being integral with each other, said middle portion defining an opening through which air may pass to the power source cooling system, said bottom piece being coupled with the vehicle for shifting to an open position whereat the power source is generally exposed;

a top piece received on the bottom piece to form a chamber between the top piece and the middle portion through which air may pass to the opening defined by the middle portion, said top piece being coupled with the bottom piece along an edge portion of the top piece for shifting motion with the bottom piece, a portion of said edge portion being spaced apart from the bottom piece to form an opening between the top and bottom piece and through which air may pass from outside of the enclosure into the chamber;

said top and bottom piece being formed of a plastic material; and means for maintaining a portion of the edge portion spaced apart from the bottom piece to allow air to pass from outside of the enclosure into the chamber, said maintaining means including a laterally outwardly extending member integral with the bottom piece, said member having an upwardly extending side structure integral therewith, and said edge portion of the top piece defining an opening within which is received the upwardly extending side structure, said side structure being received within the opening for restricting lateral motion of the edge of the top piece relative to the bottom piece.

2. A power source enclosure, as used on a vehicle having a power source cooling system, said enclosure comprising:

a bottom piece having side portions laterally spaced from the power source and extending generally vertically, and having a middle portion positioned above the power source, said middle and side portions being integral with each other, said middle portion defining an opening through which air may pass to the power source cooling system, said bottom piece being coupled with the vehicle for shifting to an open position whereat the power source is generally exposed;

a top piece received on the bottom piece to form a chamber between the top piece and the middle portion through which air may pass to the opening defined by the middle portion, said top piece being coupled with the bottom piece along an edge portion of the top piece for shifting motion with the bottom piece, a portion of said edge portion being spaced apart from the bottom piece to form an opening between the top and bottom piece and through which air may pass from outside of the enclosure into the chamber;

said top and bottom piece being formed of a plastic material; and means for maintaining a portion of the edge portion spaced apart from the bottom piece to allow air to pass from outside of the enclosure into the chamber, said maintaining means including a laterally outwardly extending member integral with the bottom piece, said member having an upwardly extending side structure integral therewith, and said edge portion of the top piece defining an opening within which is received the upwardly extending side structure, said side structure being received within the opening for restricting lateral motion of the edge of the top piece relative to the bottom piece; and corner structures formed integral with the corners of the bottom piece and receivable by corner openings defined by the top piece, said corner structures being taller than said side structure integral with the protruding member.

* * * * *